United States Patent
Nowak

(10) Patent No.: US 11,858,400 B2
(45) Date of Patent: Jan. 2, 2024

(54) CUP HOLDER TABLE MOUNT APPARATUS, AND THE LIKE

(71) Applicant: Jayco, Inc., Middlebury, IN (US)

(72) Inventor: Thomas M. Nowak, Goshen, IN (US)

(*) Notice: Subject to any disclaimer, the term of this patent is extended or adjusted under 35 U.S.C. 154(b) by 0 days.

(21) Appl. No.: 17/803,545

(22) Filed: Aug. 19, 2022

(65) Prior Publication Data
US 2023/0120466 A1 Apr. 20, 2023

Related U.S. Application Data

(63) Continuation of application No. 16/501,401, filed on Apr. 8, 2019, now Pat. No. 11,453,323.

(51) Int. Cl.
*B60N 3/00* (2006.01)
*B60N 3/10* (2006.01)

(52) U.S. Cl.
CPC .......... *B60N 3/002* (2013.01); *B60N 3/102* (2013.01)

(58) Field of Classification Search
CPC .......... A47C 7/622; A47C 7/624; A47C 7/68; A47C 7/705; A47C 7/70; A47B 31/06; B60N 3/002; B60N 3/001; B60N 3/103; B60N 3/004
USPC .............................. 108/44, 45; 297/145, 135
See application file for complete search history.

(56) References Cited

U.S. PATENT DOCUMENTS

| | | | | |
|---|---|---|---|---|
| 5,174,534 A * | 12/1992 | Mitchell | ............... | B60N 3/103 D7/619.1 |
| 5,556,181 A * | 9/1996 | Bertrand | ............... | A47B 9/00 108/14 |
| 5,651,523 A * | 7/1997 | Bridges | ............... | B60N 3/103 206/549 |
| 5,720,516 A * | 2/1998 | Young | ............... | A47C 7/68 297/188.14 |
| 6,109,580 A * | 8/2000 | Stern | ............... | A47C 7/68 248/315 |
| 7,243,991 B2 * | 7/2007 | Ojeda | ............... | B60N 2/793 108/26 |
| 7,290,746 B1 * | 11/2007 | Macias | ............... | A47C 7/705 248/314 |
| 7,401,574 B1 * | 7/2008 | Sampson | ............... | A01K 97/06 119/51.01 |
| 8,550,550 B2 * | 10/2013 | Cassese | ............... | B65D 15/00 220/23.8 |
| 9,084,491 B1 * | 7/2015 | Kattan | ............... | A47B 5/00 |
| D862,987 S * | 10/2019 | Bergin | ............... | D7/553.4 |
| 10,463,156 B2 * | 11/2019 | Jaeckel | ............... | A47C 7/624 |
| 11,453,323 B2 * | 9/2022 | Nowak | ............... | B60N 2/24 |

(Continued)

*Primary Examiner* — Jose V Chen
(74) *Attorney, Agent, or Firm* — Ryan M. Fountain

(57) ABSTRACT

A table/tray is provided which is removably mountable into a standard beverage or cup holder of a seating armrest, and maintains the cup holder capacity of the armrest, while at the same time providing the additional concurrent functionality of a table or tray adjacent to the seating assembly. This table/tray is movable by rotation within the cup holder, or otherwise, to be shifted out of the way of the user's entry/egress motion with respect to the seat assembly. This tray/table is dimensioned and/or foldable so as to be stored under the seating assembly, or closely adjacent thereto in available space, and it can be used at multiple different locations within the vehicle or other structure of use, according to the availability of cup holder recesses to receive it.

5 Claims, 13 Drawing Sheets

(56) References Cited

U.S. PATENT DOCUMENTS

| | | | | |
|---|---|---|---|---|
| 2001/0032791 | A1* | 10/2001 | Hudson | A47G 23/02 |
| | | | | 206/217 |
| 2002/0185578 | A1* | 12/2002 | Hudson | B60N 3/103 |
| | | | | 248/318 |
| 2005/0045071 | A1* | 3/2005 | Lindstrom | B60N 3/002 |
| | | | | 108/44 |
| 2005/0051584 | A1* | 3/2005 | Shelmon | B60N 3/002 |
| | | | | 224/544 |
| 2006/0220423 | A1* | 10/2006 | Bergin | A47C 7/624 |
| | | | | 297/160 |
| 2009/0021058 | A1* | 1/2009 | Rajack | A47C 7/68 |
| | | | | 297/188.18 |
| 2011/0067606 | A1* | 3/2011 | Sundarrao | A47C 7/705 |
| | | | | 108/44 |
| 2012/0306241 | A1* | 12/2012 | Winter | B60N 2/767 |
| | | | | 108/44 |
| 2016/0375810 | A1* | 12/2016 | Kong | B60N 3/002 |
| | | | | 297/145 |
| 2017/0318974 | A1* | 11/2017 | Bergin | A47C 7/70 |
| 2019/0159600 | A1* | 5/2019 | Sartor | A47C 1/12 |

* cited by examiner

CUP HOLDER TABLE MOUNT APPARATUS, AND THE LIKE

TO ALL WHOM IT MAY CONCERN

Be it known that, Thomas M. Nowak, being a citizen of the United States of America residing in the State of Indiana, has invented a new and useful:

Cup Holder Table Mount Apparatus, and the like, of which the following is a specification.

This patent application is a continuation of U.S. patent application Ser. No. 16/501,401, filed on Apr. 8, 2019.

BACKGROUND OF THE INVENTION

The present invention relates generally to accessories for recreational vehicles ("RVs"), such as motor homes, and more particularly, to apparatus for increasing the functional capabilities of seating assemblies, and the like, which are used in an RV and other vehicles.

In general, it is often advantageous to increase the uses and functions of seating assemblies, such as sofas and chairs, by adding accessory structure which accommodates and/or supports other objects that the user may want to operate or employ while seated. For example, an end table can be placed next to the arm rest of a sofa or chair to support a beverage or hand held device (such as a TV remote controller), when it is not held by the person sitting on the sofa or chair. Additionally, a movable table (on casters, for example) or lightweight tray can be positioned adjacent the sofa or chair, so as to provide a support surface for dining, reading, paper work, etc., by a person sitting in the sofa or chair. These can be readily pushed and/or lifted out of the way when the person desires to stand and leave the sofa or chair. In static structures, fixed buildings such as conventional residential homes, if not integrally formed within the seating assembly or aesthetically disposed adjacent the seating assembly, these accessories can be stored out of the way in a closet or any number of other convenient locations when not in use. When these accessories are integrally formed within the seating assembly, the seating assembly is typically enlarged to accommodate the extra features which provide this added functionality. Fixed buildings can typically accommodate the greater spacial requirements of these enhanced seating assemblies without significant difficulty or constraint.

Often, it is desirable to provide recreational vehicles, such as motor homes, with seating assemblies which are just as comfortable, if not of the same basic structure, as are found in the user's primary residence. This is desirable not just for the convenience and familiarity of the user, but also to possibly reduce manufacturing and/or furnishing costs of the RV. However, an RV typically has significantly greater spacial constraints, compared to a fixed residence. Further, for fuel economy, towability, and/or structural cost reasons, an RV typically has significant weight constraints on its contents. Also, it is preferable that the contents and features of an RV be adapted to withstand the frequent acceleration, braking, and turning motion, as well as road (and off-road) vibration, humidity variation, and thermal stresses incurred from RV mobility, wide-ranging environments of use, and RV disuse for extended periods of time. At the same time, it is usually advantageous to minimize overall RV product costs whenever possible. Thus, specific seating assemblies and accessory devices commonly used in a fixed residence may not be suitable for use in an RV. Similarly, such conveniences of fixed residences are often not suitable for use in other vehicles, such as aircraft, trains, public transportation buses, and boats (both commercial and recreational).

Accordingly, it has been suggested to modify or specially design seating assemblies for vehicles to "condense" or structurally incorporate certain of these accessory features and functions. For example, a beverage or cup holder can be mounted within the arm rest of a vehicle sofa or chair to allow, not just a bottle or cup to be securely placed, but also any other convenient hand held object device (such as a TV remote controller) to be positively located or readily accessible by a person sitting in the sofa or chair. Similarly, the arm rest of seats in public transportation vehicles, such as aircraft, have been adapted to contain foldable tables or trays which open out of the armrest for use, and then fold back into the armrest for storage. Often however, these functional features are mutually exclusive. For example, an armrest is often spacially constrained against having both a cup holder and a foldaway tray table mounted therein at the same time. Further, these functional features can have structural requirements which detract from other desirable functions of the seating assembly. For example, upholstery on the armrest can be advantageous both from an aesthetic continuity standpoint, with respect to the rest of the sofa or chair, but also so as to provide greater comfort to the user, especially over long periods of continuous use. However, upholstering of the armrest can interfere with conventional and less expensive "fold away" structures for tray tables which would be stored within the arm rest.

In addition, when such modified seating assemblies are to be used with a vehicle which can be frequently exposed to the exterior environment, such as with a pontoon boat or drop-down patio deck of an RV, the armrest structure should be sufficiently durable and reliable to retain both functionality and aesthetic appeal, despite occasional water (or rain and snow) immersion. However, the fold-way tray table structures typically found with aircraft, trains, and busses, are made with exposed metal elements which would readily corrode in those other applications. Further, the fold-way mechanism itself could inherently provide both fluid and pest access to the interior elements of the seat assembly, at the point where it opens to received the tray table.

OBJECTIVES OF THE INVENTION

Accordingly, a primary objective of this invention is to provide improvements to the functionality and convenience of seating assemblies, and the like, which are used in vehicles. These improvements include providing apparatus which:

a. are inexpensive to manufacture and maintain,
b. can be readily applied to existing seating assemblies, without the need for installation tools or special training,
c. can be mounted and stored at a variety of locations within the vehicle,
d. minimize component weight and spacial requirements,
e. increase the number of concurrent and alternative functions of the seat assembly,
f. minimize storage space requirements and obstruction to normal vehicle use, and
g. are operationally reliable for extended periods of time.

SUMMARY OF THE INVENTION

These and other objectives of the present invention are achieved by the provision of a table/tray which is removably mountable into a standard beverage or cup holder of a seating armrest, and maintains the cup holder capacity of the armrest, while at the same time providing the additional concurrent functionality of a table or tray adjacent to the seating assembly. This table/tray is movable by rotation within the cup holder, or otherwise, to be shifted out of the way of the user's entry/egress motion with respect to the seat assembly. This tray/table is dimensioned and/or foldable so as to be stored under the seating assembly, or closely adjacent thereto in available space, and it can be used at multiple different locations within the vehicle (or other structures in which it may be used, including a fixed residential building), according to the availability of cup holder recesses to receive it.

Other objects, advantages, and novel features of the present invention will become readily apparent from the following drawings and detailed description of certain preferred and alternative embodiments.

BRIEF DESCRIPTION OF THE DRAWINGS

The drawings are not to scale from one figure to the next. Multiple embodiments are shown in the drawings, with like numbers denoting components with like purposes.

DETAILED DESCRIPTION OF PREFERRED EMBODIMENTS

Figure 1:
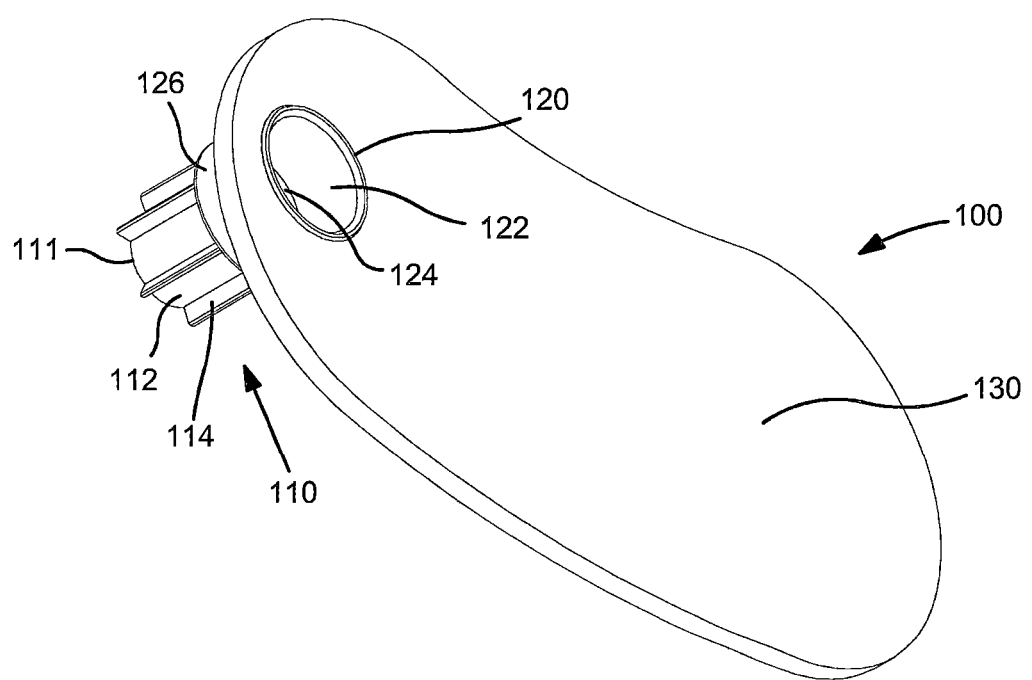
FIG. 1 shows an upper left, front perspective plan view of an apparatus according to the teachings of the present invention.
Figure 2:
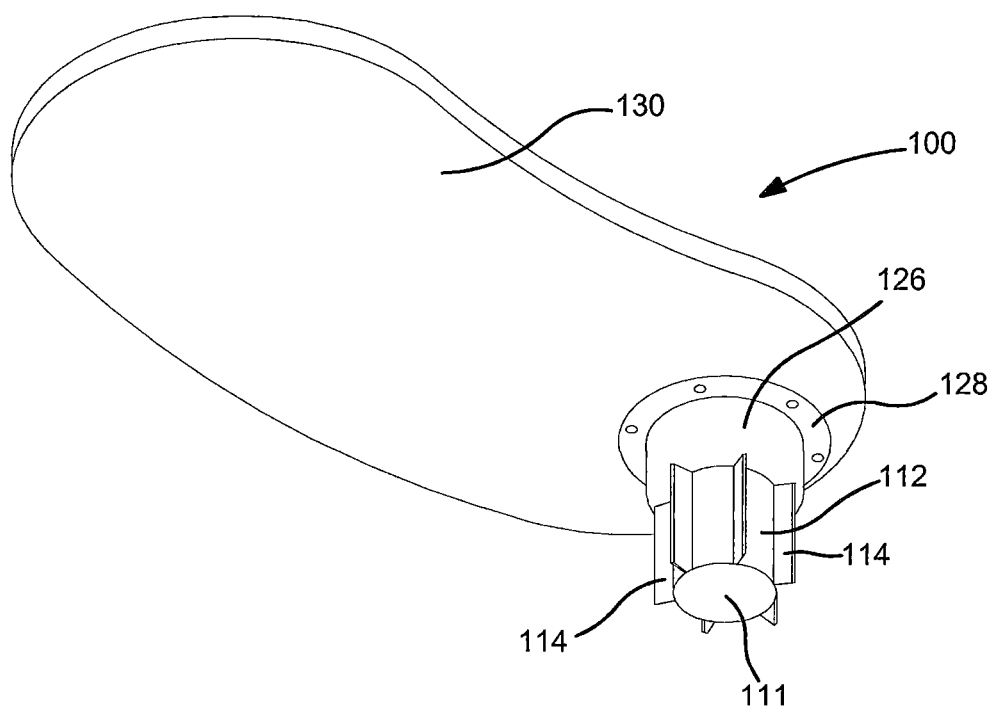
FIG. 2 shows a lower right, rear perspective plan view of the embodiment of FIG. 1.
Figure 3:
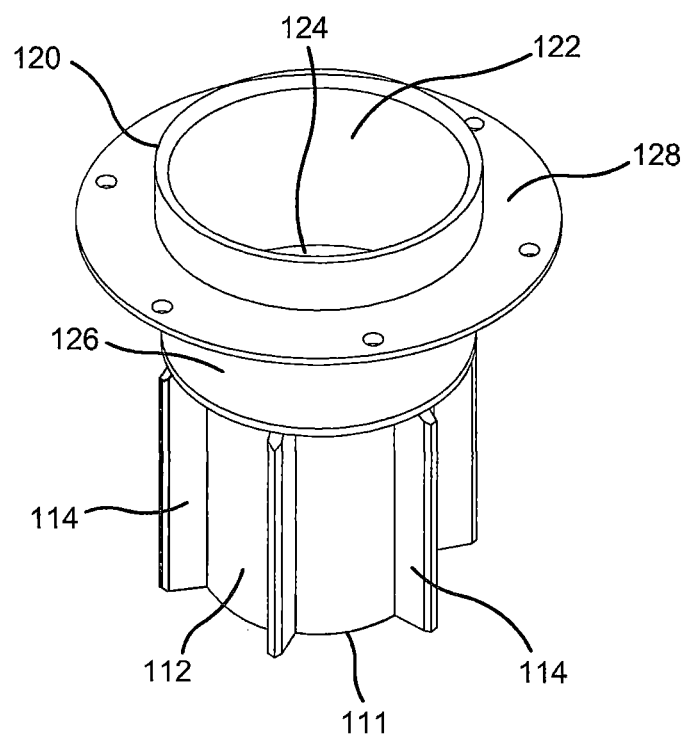
FIG. 3 shows an upper left, perspective plan view of the connector portion of the embodiment of FIG. 1.
Figure 4:
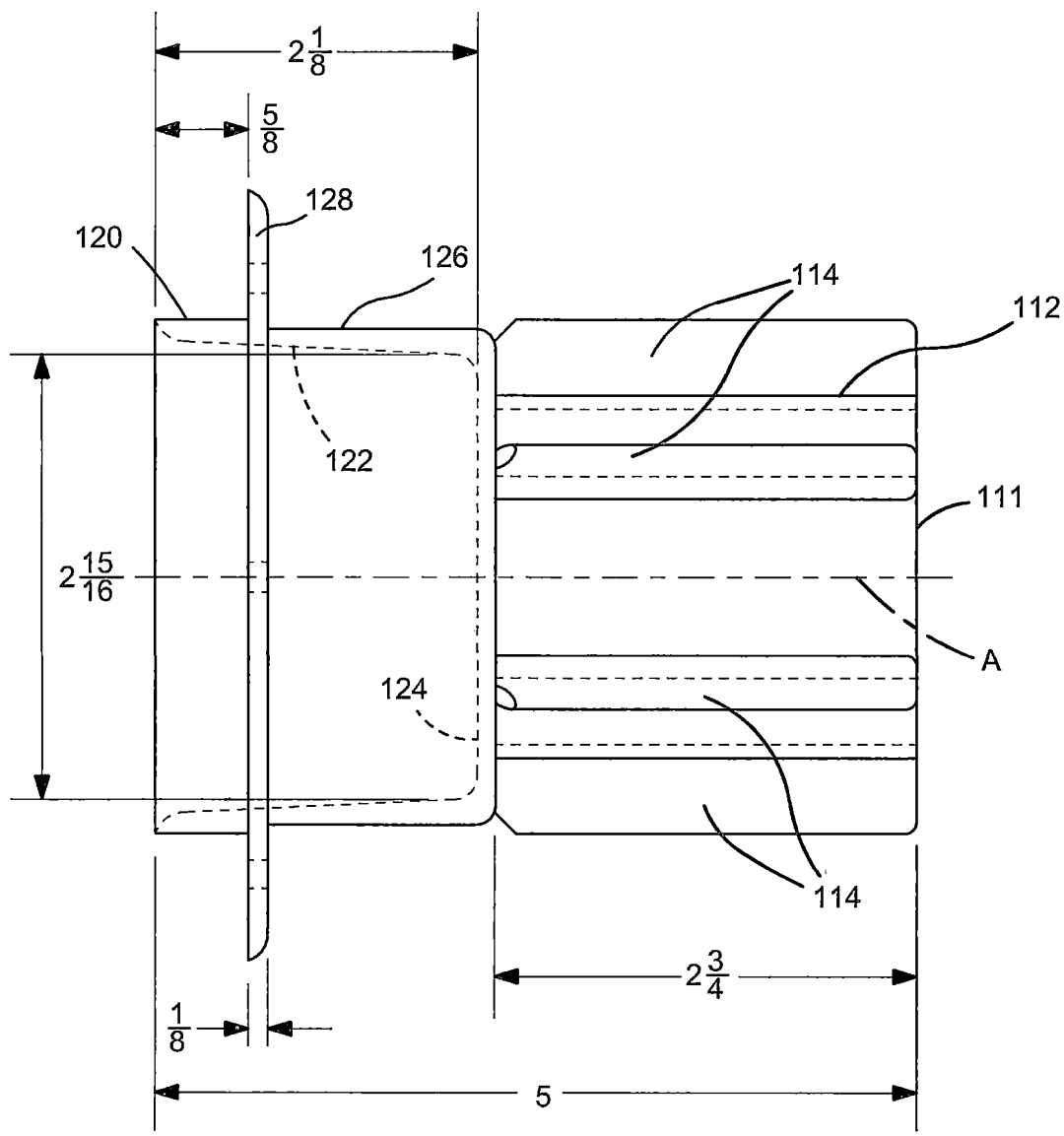
FIG. 4 shows a cross sectional view of the connector portion of FIG. 3, with dimensional indicia for reference perspective, calibrated in inches.
Figure 5:
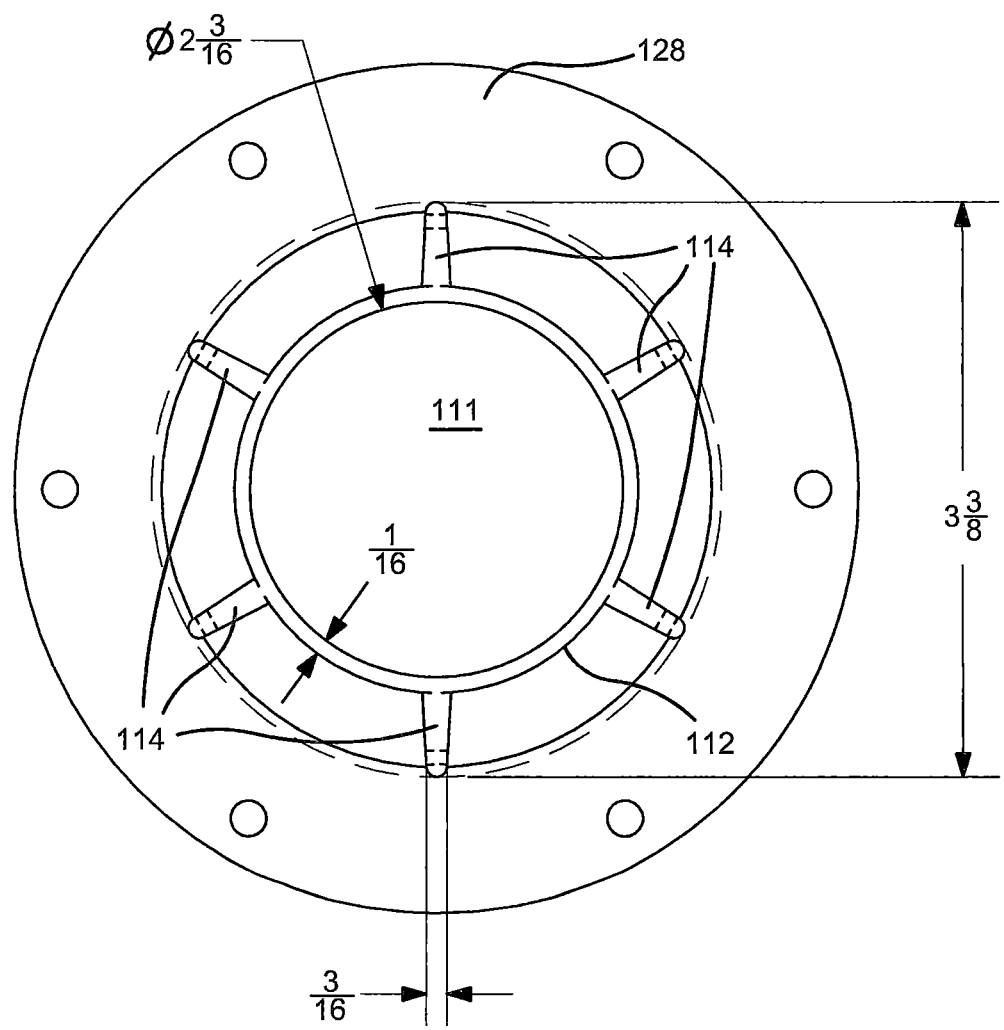
FIG. 5 shows a bottom plan view of the connector portion of FIG. 3, with dimensional indicia for reference perspective, calibrated in inches.
Figure 6:
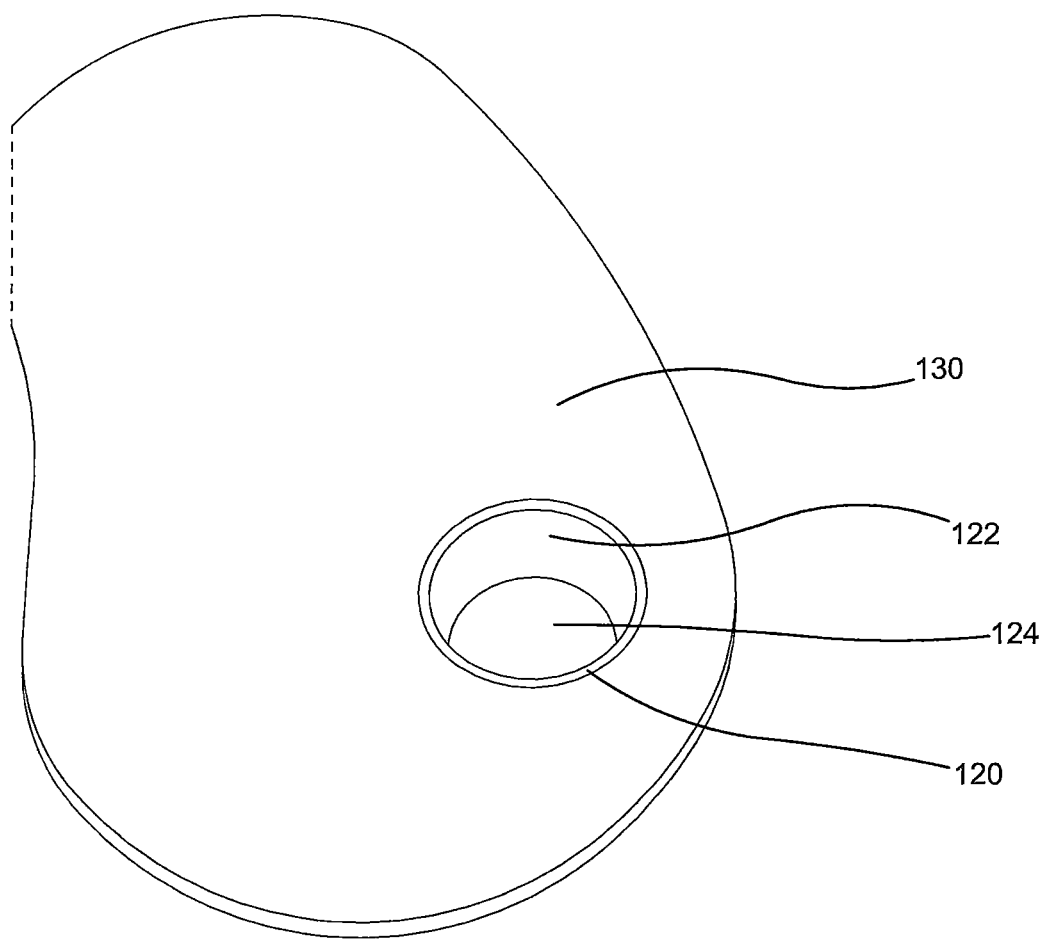
FIG. 6 shows an upper left perspective view of second embodiment of the present invention, but the background forms no portion of the invention.
Figure 7:
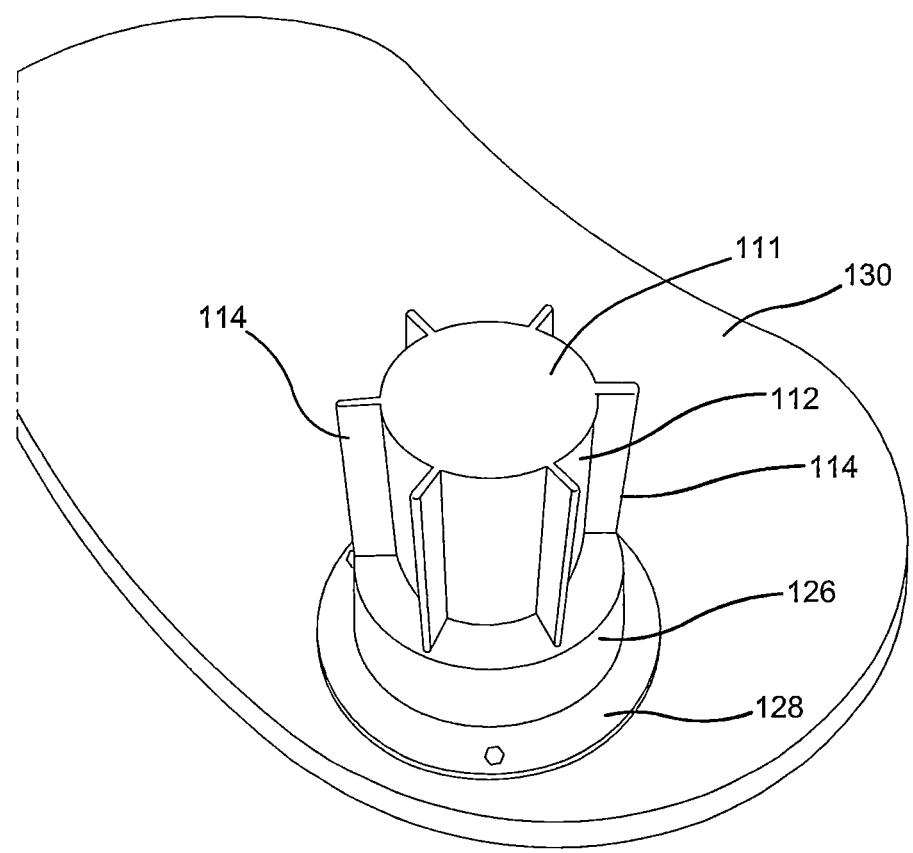
FIG. 7 shows a lower left perspective view of a portion of the embodiment of FIG. 6, but the background forms no portion of the invention.

The drawings show various embodiments of the present invention both schematically, as separate from a particular seating assembly or vehicle, and as in preferred embodiments, and as mounted within a vehicle. Various vehicular and non-vehicular applications of the present invention are specifically envisioned, but for purposes of illustration, a recreational vehicle, such as motor home, application is presented herein.

The following features are shown in the drawings:
a vehicle, specifically a motor home 10, having
    an interior side wall 12,
    a floor 14,
    a sofa 20,
    a sofa back cushion 22,
    a sofa seat cushion 24,
    an armrest 26,
    a beverage holder recess 28 extending into armrest 26,
    an ancillary device 29, and
    internal seating arrangement wall 30, and
an apparatus 100 having
    a connector portion 110 comprising:
        a lower section 111, formed with
            a cylindrical base 112 formed about axis A,
            a plurality of fins 114 spaced apart about the circumference of base 112,
        an upper section 120, formed with,
            a cylindrical recess 122 formed about axis A,
            a bottom wall 124
            an outer wall 126,
            a peripheral flange 128, and
        a second functionality portion 130, such as a table surface.

In application, apparatus 100 is removable from sofa 20, and, indeed, is completely portable from vehicle 10, so as to be usable elsewhere as needed. Apparatus 100 is preferably of a size and shape which can be conveniently stored under, behind, or beside sofa 20. If sofa 20 is positioned in direct abutment with walls 12 and 30 within vehicle 10, and no space is available under sofa 20, apparatus 100 can be stored in any nearby closet, drawer, or shelf when not in use, or it can be left attached to sofa 20.

Sofa 20 is, for example, a conventional seating assembly, with upholstery covering its entire usable surface. In the drawings, sofa 20 is illustrated with the present invention, and includes seating for multiple persons. However, the present invention is equally applicable to use with a chair, bench, or other seating assembly or structure for one or more persons. Sofa 20, together with any supplemental structure (such as wall 30) or alternative seating assembly and structure used to position, enhance, or support the seating for users, is referred to herein as a seating arrangement. As used in motor homes, sofa 20 will typically include a recess 28 within armrest 26. However, a conveniently adjacent surface or structure, such as wall 30, can also contain recess 28, for purposes of the present invention. The present invention can further be used with center console recesses in sofa 20.

Figure 11:
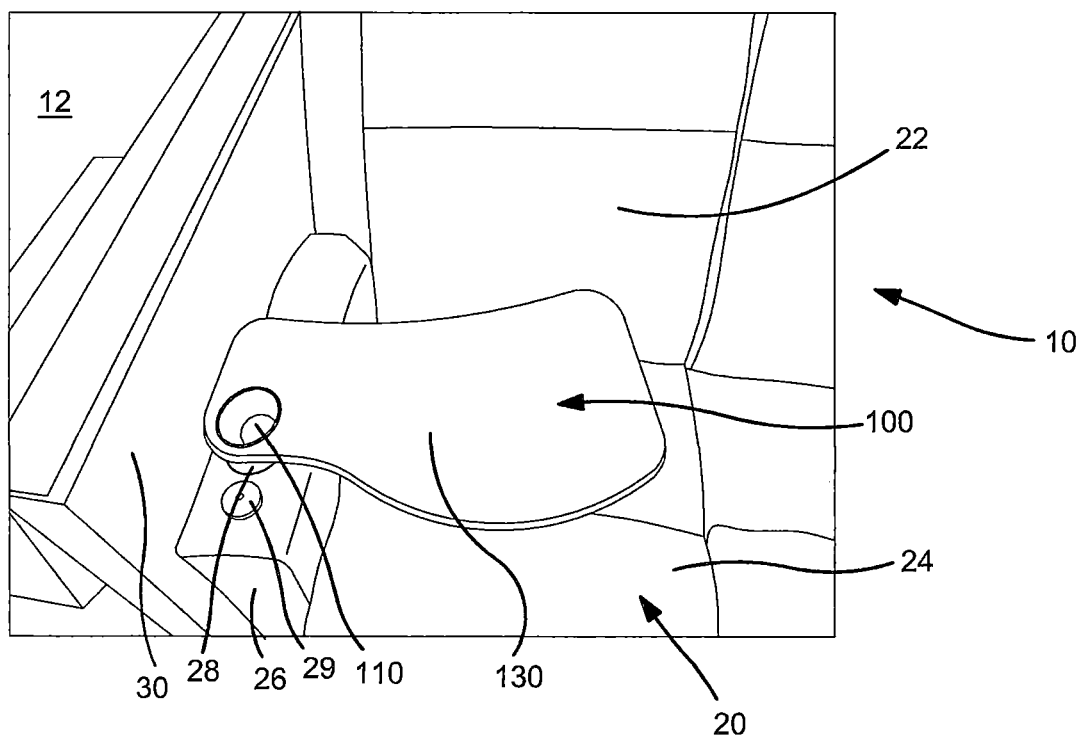
FIG. 11 shows an upper front perspective view of a third alternative embodiment of the present invention, as applied to a seating arrangement in a vehicle, with the table/tray portion oriented for use.

Recess 28 is formed in a shape suited to achieve a first function, for example, to receive and removably support a beverage within a portable container (a bottle, can, cup, or the like), and can have the shape and dimensions of a conventional cup holder integrally formed in the armrest. Alternatively, recess 28 can be formed to receive and removably support other hand-held devices, such as TV controllers, cell phones, DVD containers, and the like. As shown in the embodiment of FIG. 11, sofa 20 can also (or alternatively) include an ancillary device 29 which has, for example, a post-receiving or strut recess therein to support a drop-down bed or provide some other function in connection with the armrest. In certain embodiments of the present invention, an opening in ancillary device 29 can provide the recess 28 for use with apparatus 100.

Figure 8:
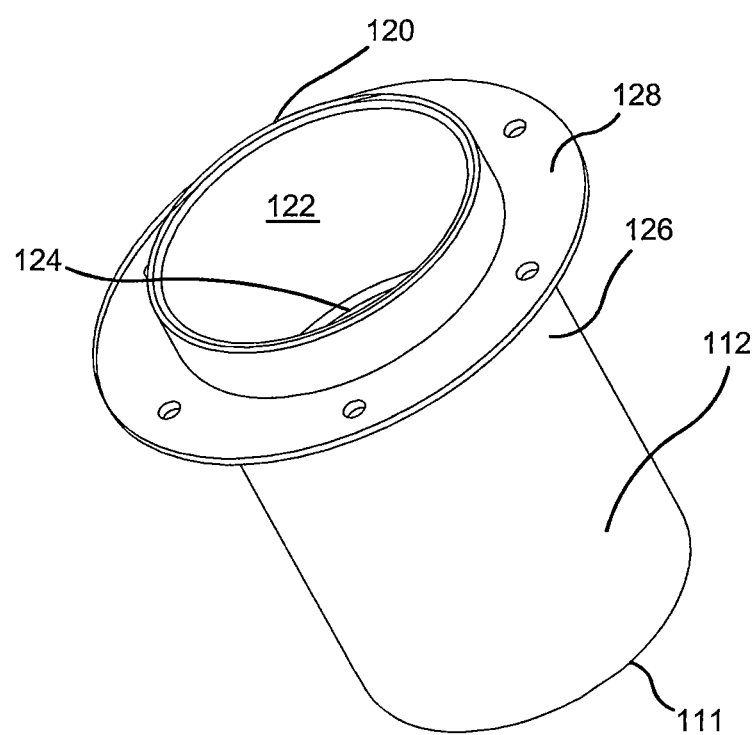
FIG. 8 shows an upper left, perspective plan view of an alternative connector portion according to the teachings of the present invention.
Figure 9:
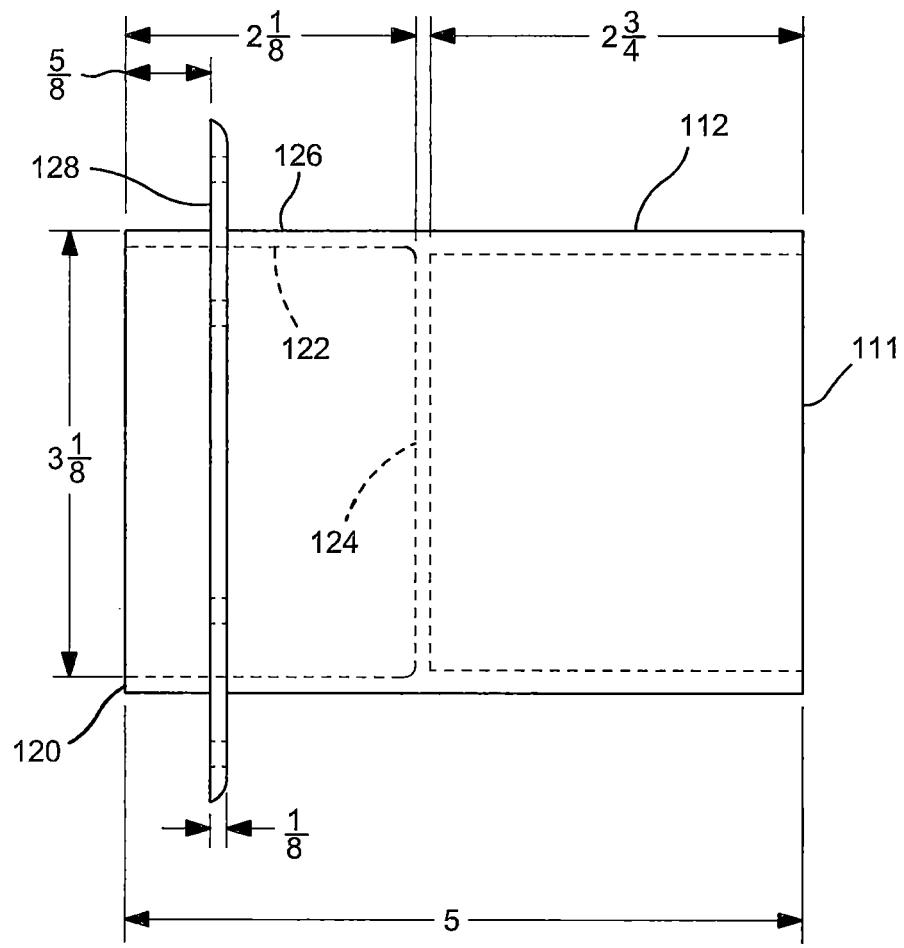
FIG. 9 shows a cross sectional view of the connector portion of FIG. 8, with dimensional indicia for reference perspective, calibrated in inches.
Figure 10:
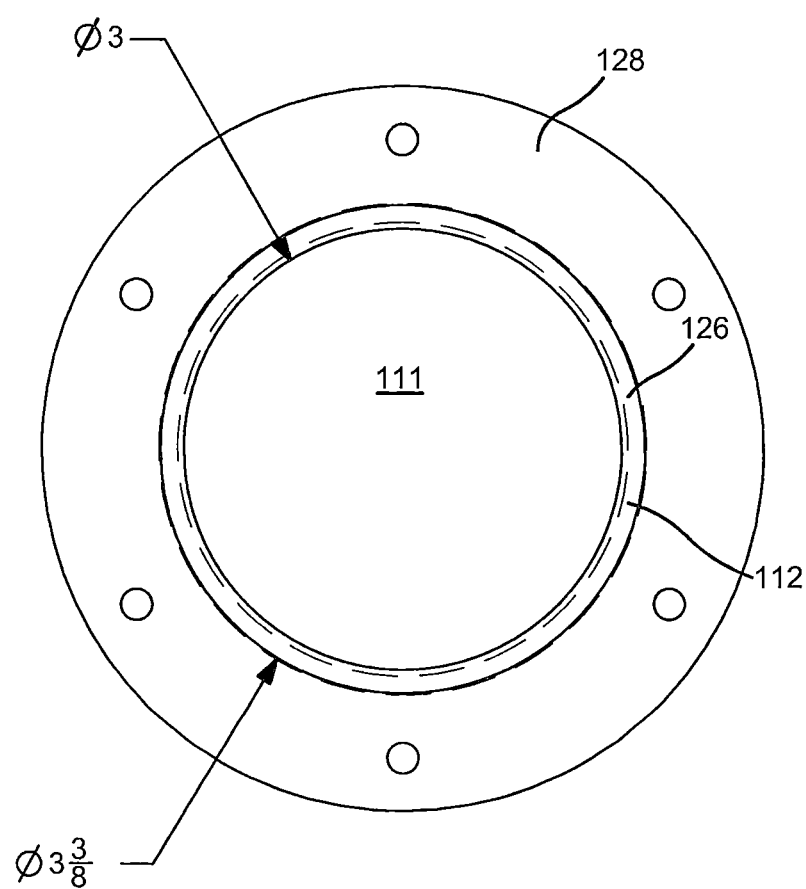
FIG. 10 shows a bottom plan view of the connector portion of FIG. 8, with dimensional indicia for reference perspective, calibrated in inches.

Connector portion 110 in the various embodiments of the drawings is, for example, shaped and dimensioned for at least three purposes, to closely fit into recess 28 so as to mount apparatus 100 therein, to securely support the table or tray 130 cantilevered thereto, and to continue to provide the function that recess 28 provides independently of the present invention. In order to closely fit within recess 28, lower section 111 can substantially match the configuration of recess 28 in whole or part. FIGS. 1-7 show embodiments where lower section 111 uses a plurality of fins 114 extending outward from base cylinder 112 to match the configuration of recess 28 in part. These fins 114 can be flexible or rigid, as desired in a given application. FIGS. 8-10 show a preferred embodiment where lower section 111 uses a uniform cylinder to closely match in whole the cylindrical shape of a given recess 28 in a particular application. In many applications, lower section 111 forms a interference fit within recess 28 to prevent vertical or side to side motion ("wobbling") of connector portion 110 within recess 28. In certain embodiments, lower portion 111 can be formed with elements which lock into apertures or structural features of the recess to preclude unintended motion of connector portion 110 with respect to recess 28. These locking elements can form a permanent or releaseable lock, as desired in a given application of the present invention. Preferably, however, lower section 111 does not cause such permanent deformation of recess 28 that when apparatus 100 is removed from recess 28, the original functionality of recess 28 is not precluded.

In order to locate and support table 130, connector portion 110 includes a peripheral flange 128 in upper section 120. The specific dimensions of flange 128 can be adapted as needed according to the dimensions of table 130 and the extent of cantilevering support expected to be needed according to the weight applied to table 130 over its length. Conventional connection mechanisms can be used to attach table 130 to flange 128, such as adhesive, threaded fasteners, and the like. Where suitable to a given application, table 130 can be press fit onto upper portion 120 to abut flange 128.

Connector portion 110 includes an upper section 120 in order to continue to provide the function that recess 28 provides when apparatus 100 is not mounted within it. In those embodiments of the present invention where lower section 111 completely fills recess 28, or prevents sufficient access to recess 28 for its functionality to be fully utilized, upper section 120 can fulfill that functionality instead of recess 28. For example, if recess 28 is shaped as a cup holder, then recess 122 can be formed with the same or substantially equivalent cup holder shape. Thus, using recess 28 to provide a mounting support for table 130 does not preclude having a cup holder adjacent the seating assembly, since recess 122 provides the cup holder. Other embodiments of the present invention can be formed with recess 122 matching the other functional configurations used for recess 28 (post holder, TV controller, tall beverage container, etc.) Thus, having a table or tray for the seating assembly does not have to be an alternative functionality, it can instead be an additional and concurrent functionality, with the present invention.

In addition, recess 122 can be formed with or without bottom wall 124. Using bottom wall 124, separating sections 111 and 120, can provide additional structural integrity for connector portion 110 and provide a shallower support floor for articles placed in recess 122. Where those articles are significantly smaller dimensionally that the opening of recess 122, bottom wall 124 could provide the user with more convenient access when retrieving the articles. Conversely, in embodiments of the present invention where bottom wall 124 is omitted, recess 122 can provide greater storage capacity for articles than was previously available with shallower configurations of recess 28.

Outer wall 126 defines the axial depth of recess 122 in the embodiments of the drawings. In certain preferred embodiments, it would at least coincide with the depth of recess 28. To the extent outer wall 126 continues below flange 128, it provides a means for spacing table 130 above the top of recess 28, and, in the embodiments of FIGS. 11-13, above armrest 26. This spacing can provide more convenient accommodation of the user, especially where the top surface of armrest 26 is relatively close, from the perspective of vertical elevation, to the top surface of seat cushion 24.

As shown in the embodiments of the drawings, table 130 is attached to connector portion 120. As illustrated in the drawings, that table 130 can have several different shapes and sizes, according to what is desired in a given application. However, the present invention can also provide additional concurrent functionality by other means. For example, instead of using a table, having a flat surface presented to the user, a tray can be mounted on connector portion which has a raised peripheral border to restrict articles from rolling or sliding off of the surface, or recesses within the surface to positively locate items on the surface. Further, in a general sense, the "item" 130 attached to connector portion 120 is a "second functionality portion," in that it provides the user with an additional function that can be used concurrently with the beverage or article holding function of of upper section 120 in connector portion 110. In alternative embodiments of the present inventions, item 130 can instead be formed as a retainer and/or charging station for electronic devices (iPads, cellular telephones, video game displays, TVs, and the like), inclined book holders, illumination devices (reading lamps, entertainment devices, and the like), sleep aids and pillows, and support structure for a wide range of other accessories which a user may desire to have adjacent and/or accessible to him or her when using the seating assembly, sofa 20, or another structure wherein a suitable recess 28 may be formed.

Figure 12:
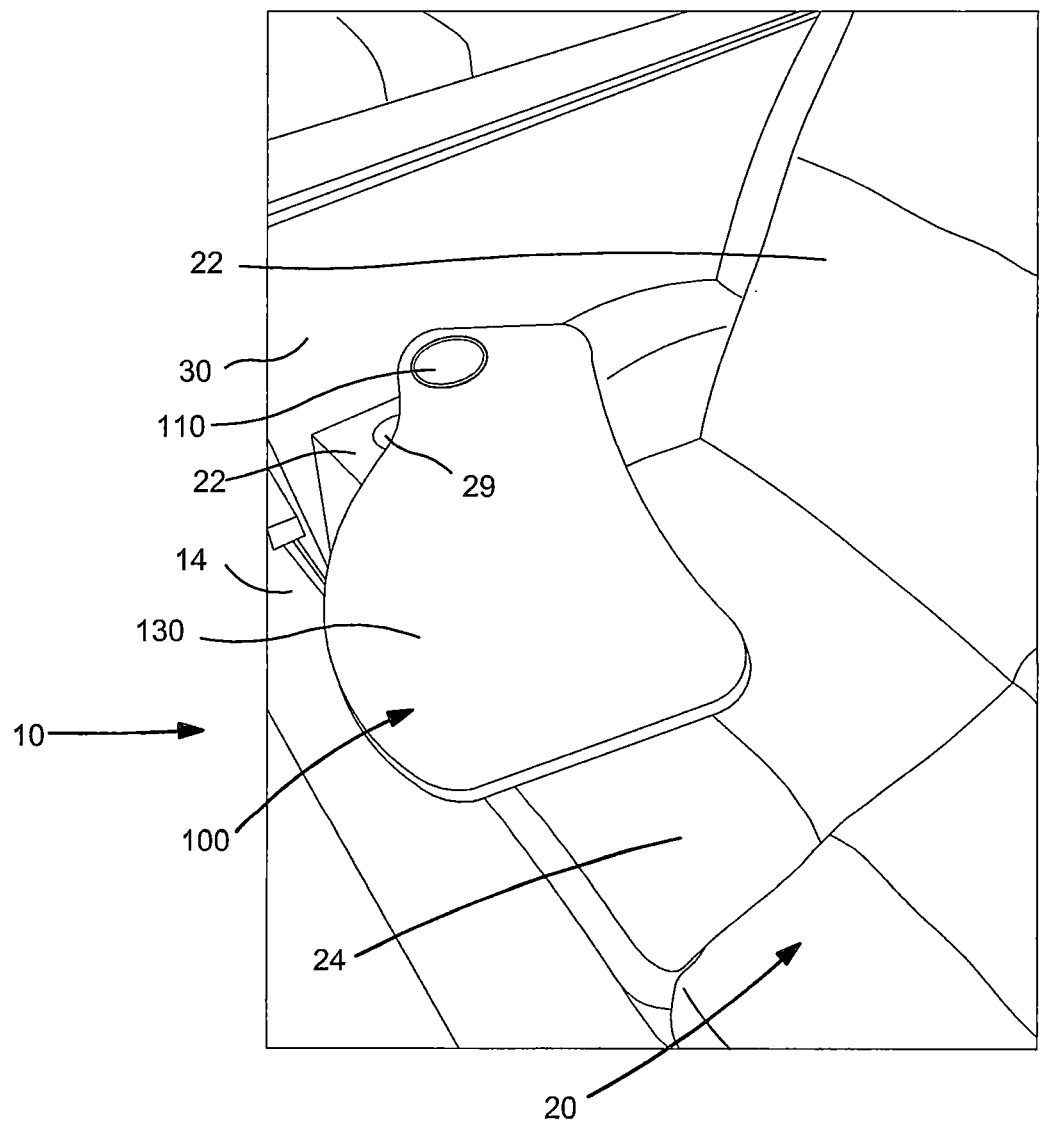
FIG. 12 shows an upper right, front perspective view of the embodiment of FIG. 11, with the table/tray portion partially rotated away from the use orientation.
Figure 13:
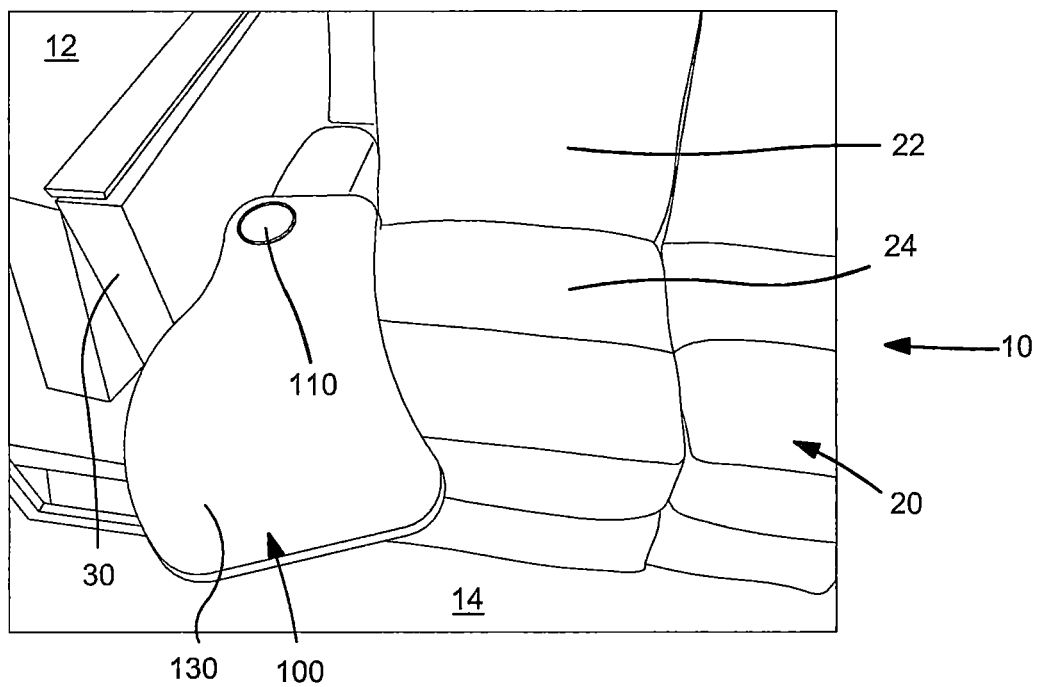
FIG. 13 shows an upper front perspective view of the embodiment of FIG. 11, with the table/tray portion fully rotated away from the use orientation.

The present invention allows apparatus 100 to be selectively positioned by the user in several alternative orientations with respect to sofa 20, as shown in FIGS. 11-13. Such orientation of apparatus 100 can be selected for the convenience of the users and/or to allow the user to readily enter to or egress from sofa 20. For example, lower section 111 can be formed to be rotatable or slidable within recess 28 such that table 130 is moved toward or away from back cushion 22, as the user desires. For example, as illustrated in FIGS. 11-13, the top surface of table 130 forms a substantially horizontal plane spaced above armrest 26 when apparatus 100 is mounted in recess 28. The user can rotate table 130 within that plane as desired between the spacial confines of wall 30 and back cushion 22. Alternatively, table 130 can be formed in multiple parts with a hinged connection, close to connector portion 100, for example, which allows at least a portion of table 130 to be moved vertically away from seat cushion 24 as needed by the user.

In preferred embodiments, apparatus 100 is removably mounted to sofa 20, but in other embodiments the mounting can be permanent. If apparatus 100 is removably mounted to sofa 20, it can be used in combination with similar recesses (cup holders, for example) in other structures at a variety of locations both within and outside of vehicle 10, since conventional cup holders tend to have certain uniform shapes and dimensions. Indeed, a fold-up or hinged embodiment of apparatus 100, for example, can be carried in a backpack or other luggage to be usable with cup holders in public transportation vehicles.

Although the present invention has been shown and described herein with respect to certain preferred embodiments and alternative configurations, those were by way of illustration and example only. For example, the present invention can be readily adapted for use with a number of different, conventional beverage holder configurations and sizes. Also, if recess 28 contains electrical connection features, connector portion 110 can also include conductive insertions which pass the electrical connection through to recess 122. Further, even if only a single recess 28 is used in armrest 26, multiple cup holder recesses can be formed in apparatus 100. Accordingly, the spirit and scope of the present invention is intended to be limited only by the terms of the appended claims.

What is claimed is:

1. An assembly, comprising:
    a seating structure having at least one armrest, having a beverage holder recess mounted in said armrest,
    a removable table spaced above said seating structure and at least in part above said armrest, having
        a recess in said table in the portion of the table above said armrest,
    a connection apparatus, for use to removably support said table above said seating structure, having
        a lower section formed to closely fit within said beverage holder recess and be selectively removable therefrom,
        a second section connected to the lower section which extends above said beverage holder recess and establishes the distance which the table is spaced above said beverage holder recess,
        a third section connected to said second section which passes through said recess,
        a flange adjacent to said third section which abuts said table and assists in fastening the connection apparatus to said table,
        a fourth section adjacent to said third section and formed to removably receive a beverage container therein.

2. The assembly according to claim 1 wherein connection apparatus is formed to permit rotation of said table within a horizontal plane above said seating structure.

3. The assembly according to claim 1 wherein the connection apparatus is formed to allow said table to be selectively removed from the vicinity of said seating structure in combination with said connection apparatus.

4. The assembly according to claim 1 further including a vehicle for supporting and maintaining said seating structure therein.

5. The assembly according to claim 1, wherein said fourth section is formed so as to receive at least a larger beverage container than said beverage holder recess.

* * * * *